(12) United States Patent
Razavi et al.

(10) Patent No.: US 6,630,546 B1
(45) Date of Patent: Oct. 7, 2003

(54) PROCESS FOR THE PREPARATION OF A POLYOLEFIN

(75) Inventors: Abbas Razavi, Mons (BE); Liliane Peters, Marbais (BE)

(73) Assignee: Fina Research, S.A., Feluy (BE)

(*) Notice: Subject to any disclaimer, the term of this patent is extended or adjusted under 35 U.S.C. 154(b) by 33 days.

(21) Appl. No.: 10/104,745

(22) Filed: Mar. 22, 2002

Related U.S. Application Data

(62) Division of application No. 09/346,881, filed on Jul. 2, 1999, now Pat. No. 6,410,476.

(30) Foreign Application Priority Data

Jul. 2, 1998 (EP) .............................. 98112233

(51) Int. Cl.$^7$ .................... C08F 4/44; C08F 210/14; B01J 31/38
(52) U.S. Cl. .................. 526/128; 526/129; 526/134; 526/160; 526/348.5; 526/943; 502/152; 556/53
(58) Field of Search .................. 502/152, 104, 502/117; 526/127, 160, 943, 348.5, 134, 128, 129; 556/53

(56) References Cited

U.S. PATENT DOCUMENTS

| 5,416,228 A | | 5/1995 | Ewen et al. | |
|---|---|---|---|---|
| 5,441,920 A | * | 8/1995 | Welborn, Jr. | ........ 502/103 |
| 5,710,224 A | * | 1/1998 | Alt et al. | ............ 526/160 |

FOREIGN PATENT DOCUMENTS

EP     0 786 466 A1   *   7/1997

* cited by examiner

Primary Examiner—Robert D. Harlan
(74) Attorney, Agent, or Firm—Hitt Gaines & Boisbrun

(57) ABSTRACT

Use of a catalyst system comprising a metallocene catalyst component of general formula R"(CpR$_m$) (Cp'R'$_n$)MQ$_2$ supported on an inert support in the slurry phase production of linear low density polyolefin, wherein Cp is a cyclopentadienyl moiety, Cp' is a substituted or unsubstituted fluorenyl ring; R" is a structural bridge imparting stereorigidity to the component; each R is independently hydrogen or hydrocarbyl having 1 to 20 carbon atoms in which $0 \leq m \leq 4$; each R' is independently hydrocarbyl having 1 to 20 carbon atoms in which $0 \leq n \leq B$; M is a Group IVB transition metal or vanadium; and each Q is hydrocarbyl having 1 to 20 carbon atoms or halogen; the metallocene having a centroid-M-centroid angle in the range 105° to 125°.

10 Claims, 1 Drawing Sheet

PROCESS FOR THE PREPARATION OF A POLYOLEFIN

This Application is a Divisional of prior application Ser. No. 09/346,881 now U.S. Pat. No. 6,410,476 filed on Jul. 2, 1999, to Abbas Razavi, et al. The above-listed Application is commonly assigned with the present invention and is incorporated herein by reference as if reproduced herein in its entirety under Rule 1.53(b).

FIELD OF THE INVENTION

The present intention relates to a process for the preparation of polyclefins, especially polyethylenes, the use of metallocene compounds as catalyst components in the production of such polyolefin and the polyolefins obtainable thereby.

BACKGROUND OF THE INVENTION

Low density polyethylene (LDPE) offers excellent optical properties and can be processed at relatively low temperatures and pressures while maintaining a good melt strength. LDPE has however limited possibilities for downgauging, due to a low draw ratio, and a low stiffness.

Linear-low-density polyethylene (LLDPE) has greatly improved downgauging possibilities and excellent tear and impact properties; its stiffness however remains low and its processability is well below that of LDPE. Also, conventional LLDPE's optical properties do not match those of LDPE. Optical properties of LLDPE have been improved by using metallocene-catalysed LDPE (mLLDPE) resins; stiffness is however not improved in these products and the processability of these grades is generally worse than that of Conventional LLDPE.

Wherever high rigidity is needed, LDPE and LLDPE compositions will require overly thick structures. Especially for LLDPR, where excellent impact and tear properties render its downgauging capability useful, the lack of rigidity may be a main drawback. High rigidity maybe a requirement for the end product, it is very often a necessity for product handling.

Metallocene catalysts are known in the production of linear low density polyethylenes. EP-A-0653445 describes polyethylenes having a density not higher than 0.94 g/cm$^3$ using a high temperature high pressure solution phase process. Another high temperature high pressure process is described in EP-A-0786466 where the production of LLDPE requires temperatures of at least 120° C.

Alternative methods of polyethylene production are disclosed in U.S. Pat. No. 5,317,036 which uses an unsupported catalyst in the gas phase and EP-A-0668295, which uses the gas phase or an unsupported catalyst in slurry phase. The metallocene catalysts of EP-A-0668295 are specially-prepared spray dried, filled metallocene catalysts.

These pocesses all require either expensive or specialised catalyst production or relatively high operating costs In the production of other polyethylene compositions, it is possible to use reaction systems based on a Ziegler-Natta catalyst or a chromium-based catalyst. These reaction systems require a high concentration of comonomer. This suffers from a drawback in that high concentration of comonomer results in increased solubility of the polyethylene produced in a slurry process. One consequence of the increased solubility of polymer is that there is a high incidence of reactor fouling. Use of a high concentration of comonomer is also costly because of the need to recycle unincorporated comonomer.

It is an aim of the present invention to overcome these disadvantages.

SUMMARY OF THE INVENTION

The present invention provides use of a catalyst system comprising a metallocene catalyst component of general formula R"(CpR$_m$) (Cp'R'$_n$)MQ$_2$ supported on an inert support in the slurry phase production of linear low density polyolefin, wherein Cp is a cyclopentadienyl moiety, Cp' is a substituted or unsubstituted fluorenyl ring; R" is a structural bridge imparting stereorigidity to the component; each R is independently hydrogen or hydrocarbyl having 1 to 20 carbon atoms in which $0 \leq m \leq 4$; each R' is independently hydrocarbyl having 1 to 20 carbon atoms in which $0 \leq n \leq 8$; M is a Group IVB transition metal or vanadium; and each Q is hydrocarbyl having 1 to 20 carbon atoms or halogen; the metallocene having a centzoid-M-centroid angle in the range 105° to 125°.

FIG. 1 shows the effect of decreasing the centroid-M-centroid angle in Zr-based metallocenes. The metallocenes of the present invention have a very open structure which permits the facile incorporation of comonomer with larger substituents such as hexene in polyolefin production. In this way, LLDPE with densities around 0.9 or lower may be produced at a commercially acceptable polymerisation temperature in a slurry process. The production of LLDPE with such low densities has hitherto not been possible with Cr-based and closed structure Cent-Zr-Cent (>125°) metallocenes in a loop slurry process. Lower comonomer concentrations need be used in the process thereby reducing the likelihood of reactor fouling and avoiding excessive use of expensive comonomer.

Preferably Cp is a substituent cyclopentadienyl in which each R is independently XR*3 in which X is C or Si and each R* is independently H or hydrocarbyl having 1 to 20 carbon atoms. More preferably the cyclopentadienyl is substituted with Ph$_2$CH, Me$_3$C, Me$_3$Si, Me, Me and Me$_3$C, Me and SiMe$_3$, Me and Ph, or Me and CH$_3$—CH—CH$_3$.

Preferably, each R' is independently YR'", in which Y is C or Si and each R'" is independently H or hydrocarbyl having 1 to 20 carbon atoms.

The structural bridge R" is generally alkylidene having 1 to 20 carbon atoms, a dialkyl germanium or silicon or siloxane, alkyl phosphine or amine, preferably Me—C—Me, Ph—C—Ph, —CH$_2$—, Et—C—Et Me—Si—Me, Ph—Si—Ph or Et—Si—Et.

The metal M is preferably Zr or Hf and each Q is preferably Cl.

In order to maximise comonomer incorporation, it is preferred that the centroid-M-centroid angle is no more than 119°.

In a further aspect, the present invention provides a process for the preparation of a linear low-density polyolefin, which comprises reacting an olefin monomer with hydrogen and an α-olefin comonomer in a slurry in the presence of a catalyst comprising (i) the metallocene catalyst and (ii) an aluminium- or boron-containing cocatalyst, wherein the catalyst is supported on an inert support. The comonomer is preferably hexene, typically present in an amount of from 2 to 10, preferably 2 to 5% by weight of the total reaction mixture.

Suitable aluminium-containing cocatalysts comprise an alumoxane, an alkyl aluminium and/or a Lewis acid.

The alumoxanes usable in the process of the present invention are well known and preferably comprise oligomeric linear and/or cyclic alkyl alumoxanes represented by the formula:

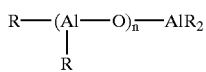

(I)

for oligomeric, linear alumoxanes and

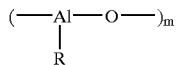

(II)

for oligomeric, cyclic alumoxane, wherein n is 1–40, preferably 10–20, m is 3–40, preferably 3–20 and R is a $C_1$–$C_8$ alkyl group and preferably methyl, Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl borato-triphenylcarbenium as described in EP-A-0427696, or those of the general formula [L'-H]+[B $Ar_1 Ar_2 X_3 X_4$]− as described in EP-A-0277004 (page 6, line 30 to page 7, line 7).

The catalyst system is employed in a slurry process, which is heterogeneous. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene.

Preferably, the support is a silica having a surface area comprised between 200 and 900 $m^2/g$ and a pore volume comprised between 0.5 and 4 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the metallocene and alumoxane are dissolved in toluene prior to addition to the support material.

Where the reaction is performed in a slurry using, for example, isobutane, a reaction temperature in the range 70° C. to 110° C. may be used.

A linear low-density polyethylene is obtainable from the process with a density below 0.93 g/cc and preferably in the range 0.90 to 0.92. The polyethylene preferably has a molecular weight distribution in the range 2 to 4.5, preferably around 3 and more preferably is partially long chain branched so as to facilitate processing.

This invention will now be described in further detail by way of example only, with reference to the following Examples and accompanying drawings, in which:

DETAILED DESCRIPTION OF THE INVENTION

EXAMPLE 1

Figure 1:
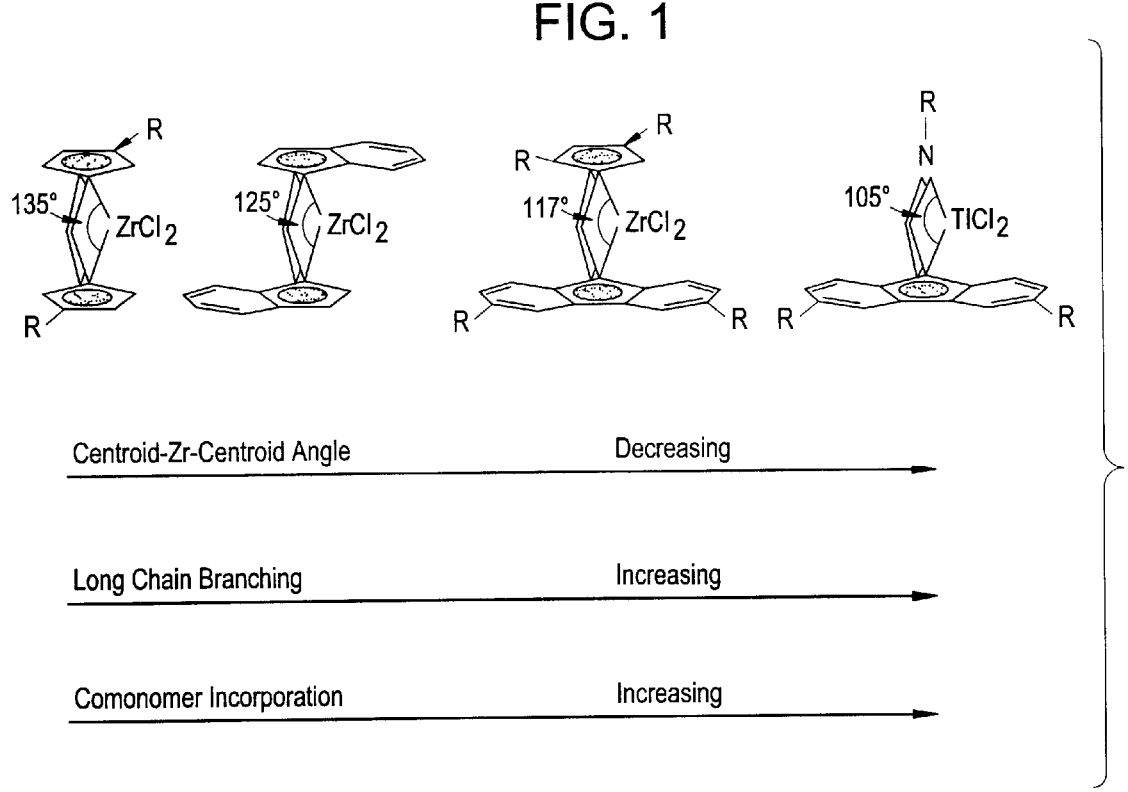
FIG. 1 shows centroid-M-centoid angles for some metallocenes.

CATALYST PREPARATION $Me_2CCpFluZrCl_2$ was prepared in accordance with the method of Razavi and Ferrara published in Journal of Organometallic Chemistry, 435 (1992) pages 299 to 310.

The support used in a silica having a total pore volume of 4.22 ml/g and a surface area of 322 $m^2/g$. This silica is further prepared by drying in high vacuum on a schlenk line for three hours to remove the physically absorbed water. 5 g of this silica are suspended in 50 ml of toluene and placed in a round bottom flask equipped with magnetic stirrer, nitrogen inlet and dropping funnel.

An amount of 0.31 g of the metallocene is reacted with 25 ml of methylalumoxane (MAO 30 wt % in toluene) at a temperature of 25° C. during 10 minutes to give a solution mixture of the corresponding metallocenium cation and the anionic methylalumoxane oligomer.

Then the resulting solution comprising the metallocenium cation and the anionic methylalumoxane oligomer is added to the support under a nitrogen atmosphere via the dropping funnel which is replaced immediately after with a reflux condenser. The mixture is heated to 110° C. for 90 minutes. Then the reaction mixture is cooled down to room temperature, filtered under nitrogen and washed with toluene.

The catalyst obtained is then washed with pentane and dried under a mild vacuum.

EXAMPLES 2 TO 7

Bench Scale Polymerisation procedures and results

Each polymerisation run was performed as described in the following Tables in a 4l autoclave type reactor. In all cases a polymerisation temperature of 80° C. was used and the diluent was 2 l of isobutane. The catalyst in each case was prepared in accordance with the method indicated.

It will be apparent from each of Examples 2a, 2b, 2c and 3, as set out in Tables 1 to 4 respectively, that polyethylene products of low density are obtainable according to the invention, especially in the presence of hexene comonomer. High molecular weights are also apparent. This contrasts with comparative Examples 4 to 7 where higher densities are obtained.

TABLE 1

Polymerization with $Ph_2CCpFluZrCl_2/SiO_2$ ASAHI', H121c.MAO* (Example 2a)
Influence of the hexene/ethylene wt ratio on the fluff density

| Entry | C6/C2 wt % ratio | Hourly Prod. (gPE/gcat/h) | $MI^2$ (g/10 min) | HLMI (g/10 min) | SR | Density (g/cc) | $M^N$ (kDa) | $M^W$ (kDa) | $M^z$ (kDa) | D | D' |
|---|---|---|---|---|---|---|---|---|---|---|---|
| 1 | 0.00 | 820 | 0.06 | 2.09 | 37 | 0.942 | | | | | |
| 2 | 0.41 | 1,620 | too low | 0.32 | / | 0.914 | | | | | |
| 3 | 0.61 | 2,540 | too low | 0.17 | / | 0.918 | 76 | 336 | 958 | 4.4 | 2.9 |
| 4 | 0.81 | 2,130 | too low | 0.36 | / | 0.912 | 81 | 307 | 902 | 3.8 | 2.9 |
| 5(1) | 1.22 | 700 | 0.06 | 2.74 | 44 | 0.908 | | | | | |

Monomer: 6 wt % ethylene; (1); 4 wt % ethylene
Hydrogen: 0.25 N1
Key: $MI_2$ = Melt index; Mn = number average molecular weight; Mw = weight average molecular weight; D = Mw/Mn; D' = Mz/Mw; SR = Shear Ratio (HLMI/$MI_2$)
*made according to the method of Razavi and Atwood J. Organometallic Chem. 459 (1993), 117–123.

TABLE 2

Polymerization with $Ph_2CCpFluZrCl_2/SiO_2$ ASAHI', H121c.MAO* (Example 2b)
Influence of the hexene/ethylene wt ratio on the fluff density

| Entry | Ethylene (wt %) | Hydrogen (N1) | 1-hexene (wt %) | C6/C2 wt % ratio | Hourly Prod. (gPE/gCat/h) | $MI_2$ (g/10 min) | HLMI (g/10 min) | SR | Density (g/cc) |
|---|---|---|---|---|---|---|---|---|---|
| 1 | 6 | 0.25 | 2.44 | 0.41 | 1,560 | 11.29 | too high | / | 0.923 |
| 2 | 4 | 0.25 | 4.88 | 1.22 | 880 | 80.00 | too high | / | 0.918 |

*made according to the method of Razavi and Atwood J. Organometallic Chem. 459 (1993), 117–123

TABLE 3

Polymerization with $Ph_2CCpFluZrCl_2/SiO_2$, ASAHI H121c.MAO* (Example 2c)
Influence of the hydrogen content on the melt index

| Entry | Hydrogen | Hourly Prod. (gPE/gCat/h) | $MI_2$ (g/10 min) | HLMI (g/10 min) | SR | Density (g/cc) | MN (kDa) | MW (kDa) | Mz (kDa) | D | D' |
|---|---|---|---|---|---|---|---|---|---|---|---|
| 1 | 0.00 | 880 | too low | too low | / | 0.913 | | | | | |
| 2 | 0.25 | 1,620 | too low | 0.32 | / | 0.914 | | | | | |
| 3 | 1.00 | 1,200 | 0.27 | 9.91 | 36 | 0.918 | 39 | 131 | 444 | 3.4 | 3.4 |

C6/C2 wt ratio: 0.41
Key: $MI_2$ = Melt index; Mn = number average molecular weight; Mw = weight average molecular weight; D = Mw/Mn; D' = Mz/Mw; SR = Shear Ratio (HLMI/$MI_2$)
*made according to Razavi and Atwood J. Organometallic Chem. 497 (1995), 105–111

TABLE 4

Polymerization with $Me_2C(3tBuCp)FluZrCl_2/SiO_2$, ASAHI H121C.MAO* (Example 3)

| Entry | Ethylene (wt %) | hydrogen (N1) | C6/C2 wt % ratio | Hourly Prod. (gPE/gCat/h) | $MI_2$ (g/10 min) | HLMI (g/10 min) | Density (g/cc) |
|---|---|---|---|---|---|---|---|
| 1 | 6 | 0.25 | 0.00 | 900 | too low | too low | 0.930 |
| 2 | 6 | 0.25 | 0.41* | 2,670 | too low | 0.06 | 0.917 |
| 3 | 6 | 0.25 | 0.41 | 3,280 | too low | 0.13 | 0.920 |
| 4 | 6 | 0.25 | 0.61* | 2,600 | too low | 0.03 | 0.913 |
| 5 | 6 | 0.25 | 0.61 | 3,550 | too low | 0.01 | 0.913 |
| 6 | 6 | 0.25 | 0.81 | 2,770 | too low | 0.16 | 0.913 |
| 7 | 4 | 0.25 | 1.22* | 1,550 | too low | 1.20 | 0.910 |
| 8 | 3 | 0.25 | 1.62* | 1,410 | too low | 1.60 | 0.907 |

(*): no prepolym.
*made according to Razavi and Atwood J. Organometallic Chem. 520 (1996), 115–120

TABLE 5

Polymerization with Et(THI)₂ZrCl₂/SiO₂, MAO (Example 4 - Comparative)

| Entry | Ethylene (Wt %) | Hydrogen (Nl) | 1-hexene (wt %) | C6/C2 wt % ratio | Hourly Prod. (gPE/gCat/h) | MI₂ (g/10 min) | HLMI (g/10 min) | SR | Density |
|---|---|---|---|---|---|---|---|---|---|
| 1 | 6 | 0.25 | 0 | 0 | 9,175 | too low | 0.06 | / | 0.946 |
| 2 | 6 | 0.25 | 2.44 | 0.41 | 23,000 | 0.09 | 6.89 | 77 | 0.933 |
| 3 | 6 | 0.25 | 3.66 | 0.61 | 14,817 | 0.04 | 3.85 | 89 | <0.930 |

TABLE 6

Polymerization with Et(Ind)₂ZrCl₂/SiO₂, MAO (Example 5 - Comparative)

| Entry | Ethylene (wt %) | Hydrogen (Nl) | 1-hexene (wt %) | C6/C2 wt % ratio | Hourly Prod. (gPE/gCat/h) | MI₂ (g/10 min) | HLMI (g/10 min) | SR | Density (g/cc) |
|---|---|---|---|---|---|---|---|---|---|
| 1 | 6 | 0.25 | 0.00 | 0.00 | 3,430 | 0.55 | 28.2 | 51 | 0.951 |
| 2 | 6 | 0.25 | 0.61 | 0.10 | 6,040 | 0.87 | 47.5 | 55 | 0.942 |
| 3 | 6 | 0.25 | 1.22 | 0.20 | 7,700 | 0.05 | 5.49 | 122 | 0.938 |
| 4 | 6 | 0.25 | 2.44 | 0.41 | 10,280 | 0.03 | 4.49 | 140 | 0.932 |
| 5 | 6 | 0.25 | 3.66 | 0.61 | 10,020 | 0.27 | 17.97 | 67 | <0.930 |
| 6 | 6 | 0.25 | 4.88 | 0.81 | 5,600 | 1.54 | 73.93 | 48 | <0.930 |

TABLE 7

Polymerization with (nBuCp)₂ZrCl₂/SiO₂, MAO (Example 6 - Comparative)

| Entry | Ethylene (wt %) | Hydrogen (Nl) | 1-hexene (wt %) | C6/C2 wt % ratio | Hourly Prod. (gPE/gCat/h) | MI₂ (g/10 min) | HLMI (g/10 min) | SR | Density |
|---|---|---|---|---|---|---|---|---|---|
| 1 | 6 | 0.25 | 0.00 | 0.00 | 4,506 | 0.58 | 11.43 | 20 | 0.956 |
| 2 | 6 | 0.25 | 0.30 | 0.05 | 4,400 | 1.66 | 28.08 | 17 | 0.947 |
| 3 | 6 | 0.25 | 1.22 | 0.20 | 6,480 | 1.89 | 30.60 | 16 | 0.944 |
| 4 | 6 | 0.25 | 2.44 | 0.41 | 7,050 | 2.05 | 32.54 | 16 | 0.936 |
| 5 | 6 | 0.25 | 3.66 | 0.61 | 6,900 | 2.36 | 37.97 | 16 | 0.933 |
| 6 | 6 | 0.25 | 4.88 | 0.81 | 6,720 | 2.67 | 44.72 | 17 | 0.930 |

TABLE 8

Polymerization with (iBuCp)₂ZrCl₂/SiO₂, MAO (Example 7 - Comparative)

| Entry | Ethylene (wt %) | Hydrogen (Nl) | 1-hexene (wt %) | C6/C2 wt % ratio | Hourly Prod. (gPE/gcat/h) | MI₂ (g/10 min) | HLMI (g/10 min) | SR | Density |
|---|---|---|---|---|---|---|---|---|---|
| 1 | 6 | 0.25 | 0.00 | 0.00 | 7,900 | 3.07 | 54.38 | 18 | 0.955 |
| 2 | 6 | 0.25 | 1.22 | 0.20 | 8,840 | 4.290 | 69.37 | 16 | 0.943 |
| 3 | 6 | 0.25 | 2.44 | 0.41 | 12,520 | 4.43 | 69.80 | 16 | 0.938 |
| 4 | 6 | 0.25 | 3.66 | 0.61 | 10,600 | 4.71 | 97.57 | 21 | 0.934 |
| 5 | 6 | 0.25 | 4.88 | 0.81 | 7,200 | 5.16 | 86.33 | 17 | 0.935 |

EXAMPLES 8 TO 11

Pilot Plant Scale Polymerisation procedures and results

The supported metallocene catalyst of Example 2 was used on a, pilot plant scale in the 70 litre loop reactor under the conditions set out in Table 9. Table 9 also shows the results of these pilot plant scale examples, which confirm the earlier bench scale results.

TABLE 9

| Example | | 8 | 9 | 10 | 11 |
|---|---|---|---|---|---|
| CATALYST TYPE | | (Ph)2 C Cp Flu (ZrCl2/ SiO2 .MAO) | (Ph)2 C Cp Flu (ZrCl2/ SiO2 .MAO) | (Ph)2 C Cp (ZrCl2/ SiO2 .MAO) | (Ph)2 C Cp (ZrCl2/ SiO2 .MAO) |
| LOOP OPER. COND. | | | | | |
| Temp | (° C.) | 85 | 85 | 85 | 80 |
| Alkyl (TIBAL) | (ppm/iC4) | 250 | 250 | 250 | 250 |

TABLE 9-continued

| Example | | 8 | 9 | 10 | 11 |
|---|---|---|---|---|---|
| Antifouling | (ppm/iC4) | 4 | 4 | 4 | 4 |
| C2— | (kg/h) | 7 | 8.5 | 7.5 | 7 |
| C6— | (cc/h) | 650 | 1049 | 1033 | 1467 |
| H2 | (Nl/h) | 5 | 5 | 5 | 5 |
| IC4 | (kg/h) | 26 | 26 | 26 | 26 |
| OFF-GAS FINAL | | | | | |
| 2- | (wt %) | 5.6 | 6.7 | 6.0 | 6.4 |
| C6— | (wt %) | 0.88 | 1.38 | 1.23 | 2.07 |
| H2 | (mole %) | 0.024 | 0.028 | 0.029 | 0.031 |
| C6—/C2— | ratio | 0.16 | 0.21 | 0.21 | 0.32 |
| H2/C2— | ratio | 0.004 | 0.004 | 0.005 | 0.005 |
| CATALYST TYPE | | (Ph)2 C Cp Flu (ZrCl2/ SiO2 .MAO) | (Ph)2 C Cp Flu (ZrCl2/ SiO2 .MAO) | (Ph)2 C Cp Flu (ZrCl2/ SiO2 .MAO) | (Ph)2 C Cp Flu (ZrCl2/ SiO2 .MAO) |
| FLUFF FINAL | | | | | |
| HLMI | (g/10') | 0.66 | 0.53 | 0.97 | 1.24 |
| MI$_2$ | (g/10') | **** | **** | **** | **** |
| MI$_5$ | (g/10') | **** | **** | **** | **** |
| SR2 | | **** | **** | **** | **** |
| Density | (g/cc) | 0.918 | 0.917 | 0.914 | 0.912 |
| Bulk Density | (g/cc) | 0.37 | 0.37 | 0.37 | 0.37 |

What is claimed is:

1. A process for the preparation of a linear low-density polyolefin, comprising:

reacting an olefin monomer with hydrogen and an α-olefin co-monomer in a slurry polymerization in the presence of a catalyst comprising:

(i) a metallocene catalyst component of general formula R"(CpR$_m$)(Cp'R'$_n$)MQ$_2$, wherein Cp is a cyclopentadienyl moiety, Cp' is a substituted fluorenyl ring; R" is a structural bridge imparting stereorigidity to said metallocene catalyst component; each R is independently hydrogen or a hydrocarbyl having 1 to 20 carbon atoms in which $0 \leq m \leq 4$; each R' is independently —SiR'''$_3$ in which each R''' is independently hydrogen or a hydrocarbyl having 1 to 20 carbon atoms, and in which $0 \leq n \leq 8$; M is a Group IVB transition metal or vanadium; and each Q is hydrocarbyl having 1 to 20 atoms or halogen; said metallocene catalyst component having a centroid-M-centroid angle in the range from 105° to 125°;

(ii) an aluminum- or boron-containing co-catalyst; and (iii) said catalyst is supported on an inert support.

2. The process according to claim 1, wherein said olefin monomer is ethylene and said polyolefin is polyethylene.

3. The process according to claim 1, wherein said co-monomer comprises 1-hexene.

4. The process according to claim 3, wherein said 1-hexane is present in an amount ranging from 2 to 10% by weight of the total reaction mixture.

5. The process according to claim 1, wherein said co-catalyst is selected from the group consisting of:

an alumoxane;

an alkyl aluminum;

a triphenylcarbenium boronate; and a Lewis acid.

6. The process according to claim 1, wherein said inert support comprises a silica support.

7. The process according to claim 1, wherein said reacting is carried out at a temperature ranging from 70° to 110° C.

8. The process according to claim 7, wherein Cp is a substituted cyclopentadienyl in which each R is a carbyl that includes Si.

9. The process according to claim 7, wherein said centroid-M-centroid angle is no more than 119°.

10. The process according to claim 3, wherein said 1-hexane is present in an amount ranging from 2 to 5% by weight of the total reaction mixture.

\* \* \* \* \*